Inventor:
William E. Glenn Jr.,
by John P. Dellitt
His Attorney.

June 11, 1963 W. E. GLENN, JR 3,093,705

PROJECTING SYSTEM

Filed Aug. 1, 1961 2 Sheets-Sheet 2

Inventor:
William E. Glenn, Jr.,
by John P. Dellitt
His Attorney.

United States Patent Office 3,093,705
Patented June 11, 1963

3,093,705
PROJECTING SYSTEM

William E. Glenn, Jr., Scotia, N.Y., assignor to General Electric Company, a corporation of New York Filed Aug. 1, 1961, Ser. No. 128,944
11 Claims. (Cl. 178—5.4)

The present invention relates to a system for projecting light as a function of applied electrical signals.

In my patent, 2,813,146, granted November 12, 1957, and assigned to the assignee of the present invention, there is disclosed a system for projecting color light as a function of diffraction gratings in a light modulating medium. In a preferred embodiment, color television signals modulate an electron beam that forms, simultaneously, a plurality of charge patterns on the deformable light modulating medium wherein each charge pattern corresponds to a different color and to the intensity of the respective color in the televised scene. When the electrons in these charge patterns press in on the deformable light modulating medium they produce a plurality of diffraction gratings each having parameters corresponding to the different color of the televised scene. The light diffracted by these diffraction gratings when projected on a projection screen produces a color image of the televised scene.

In both the prior art black and white and color projection systems a plurality of narrow light sources are required and also the masking system must have a plurality of narrow slits. Of course, it would be advantageous if the masking system could be eliminated and if the light sources could be much larger.

Accordingly, an object of the present invention is to provide an improved projection system.

Still another object of the present invention is to provide an improved projection system for projecting either color or black and white pictures.

A further object of the present invention is to provide a projection system in which a large light source can be used.

A still further object of the present invention is to provide a projection system in which there are no separate masking means.

In some prior art projection systems a signal to noise ratio of the projected light is fairly low. It would be advantageous to have a projection system in which this ratio is very high.

Thus another object of the present invention is to provide a projection system having a high signal to noise ratio of projected light.

These and other objects are provided in a preferred embodiment of my invention in which diffraction gratings are formed in the light modulating medium, which diffraction gratings are high dispersion diffraction gratings. Thus the grating spacings are very small being of the order of 3 microns. Due to the high dispersion of the diffraction gratings, the diffraction patterns for each color are quite wide and thus are of the order of width of the *f* stop for the projection lens. Thus, instead of using a masking system, the lens holder for the projection lens is used to mask the light in the aperture, for the projection lens transmits the desired color light. Due to the large size of the openings for the projection lens the light sources providing the light which is diffracted by the diffraction gratings are quite large and thus do not have to be masked.

The novel features believed characteristics of the invention are set forth in the appended claims. The invention itself, however, together with further objects and advantages thereof, may best be understood by reference to the following description, taken in connection with the accompanying drawing, in which:

Figure 1:
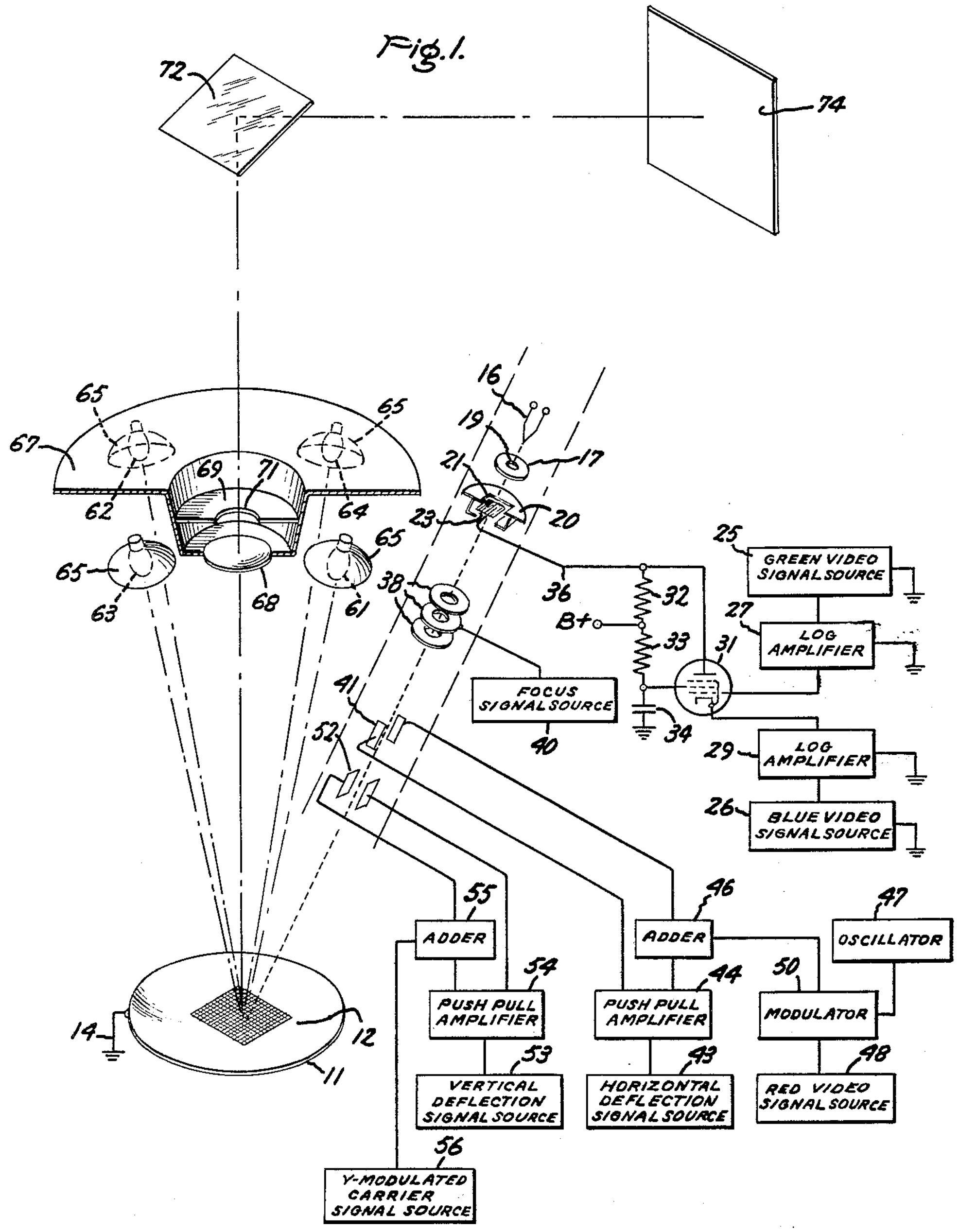
FIG. 1 is a schematic prospective illustration of a preferred embodiment of my invention.

Referring now in more detail to FIG. 1 there is provided a container 11 for a deformable medium 12, this deformable medium being for example of the type disclosed and claimed in my Patent 2,943,147, issued June 28, 1960, and assigned to the assignee of the present invention. The medium may alternatively comprise a thermoplastic medium of the type described and claimed in my copending application, Serial Number 84,424, filed January 21, 1961, entitled "Medium for Recording"and filed as a division of my copending application, Serial Number 8,842, filed February 15, 1960, entitled "Method and Apparatus for Recording," said application being a continuation-in-part of my application Serial Number 698,167, filed November 27, 1957 (now abandoned), and of my application Serial Number 783,584, filed December 29, 1958 (now abandoned). All of these applications are assigned to the assignee of the present invention.

Container 11 is a portion of a spherical surface having a radius R. The interior surface of container 11 may be coated with a conducting material that is grounded by a connector 14.

Deformations are produced in the surface of medium 12 by an electron charge pattern produced by an electron beam that may originate from the illustrated electron gun system. Of course the illustrated electron gun system is only one of several that may be used, the present invention not being limited to any particular electron gun system. In the illustrated electron gun system, a heated filament 16 produces electrons under the control of a potential supplied by means not shown to a grid control electrode 17 having an aperture 19 for the passage of the electrons. The electrons are then accelerated by an electric field produced by ground potential supplied to an anode 20. Since the anode 20 is a ground potential the cathode 16 must be maintained below ground potential by means not shown at the desired acceleration voltage for the electrons which may be of the order of 10 to 20 kilovolts.

Anode 20 has an aperture 21 across which many parallel wires 23 extend. There may be as many as 75 of these wires 23. These wires form a beam splitting arrangement that is described and claimed in my copending application, Serial Number 782,958, filed December 24, 1958, now Patent No. 3,065,295, dated November 20, 1962, entitled "Electron Beam System" and assigned to the assignee of the present invention.

Wires 23 are energized by a signal that, in a color television application, is a variable color signal produced by combining the conventional green and blue video signals. Now these signals derived from sources 25 and 26, respectively, which may be similar to the corresponding circuits in a color television receiver or camera circuit. The green video signal is converted to negative logarithmic form by a logarithmic amplifier 27 and the blue signal to the positive logarithmic form by log amplifier 29. The sum of the two logarithmic signals is obtained in an electron tube circuit including an electron tube 31 having a plate resistor 32, a screen grid resistor 33 and a screen grid capacitor 34. The positive blue video signal is applied to the cathode and the negative logarithm of the green video signal to the grid electrode, the difference of these two applied signals appearing across the plate resistor 32. Since the resulting signal is the difference of two logarithmic signals, it is the same as the logarithm of the ratio of the two signals. This resulting signal is then conducted to the wires 23 through a conductor 36.

The signal that is applied to wires 23 represents a variable color that varies between green and blue colors. As is explained in my Patent 2,919,302, granted December 29, 1959, and my copending application, Serial Number 782,958, above referred to, a variable color system can be obtained by utilizing two color signals rather than three. One of these color signals, e.g. the red color signal, is fixed while the other color signal varies depending upon the green and blue content of the televised picture. The variable color signal is a voltage the amplitude of which corresponds to the green and blue color content of the televised scene and is applied to the grid wires 23 in FIG. 1. This, in turn, controls the splitting of the electron beam as will be explained below.

The split electron beam is focused onto the surface of modulating medium 12 by a focusing signal comprising a lens system including three ring electrodes 38, the center one of which is energized by focus signal from a focus signal source 40 and the end ones of which are grounded.

The electron beams are moved in a horizontal direction across the surface of modulating medium 12 by an electric field produced by potential applied to horizontal deflection plates 41. This deflection signal is actually a sum signal that includes the conventional horizontal deflection signal and a signal that corresponds in magnitude to the red color content of the televised scene and in frequency to a fixed frequency. The conventional horizontal deflection signal is produced by a source 43 and is conducted to a push-pull amplifier 44 which converts the deflection signal into push-pull form that is suitable for the energization of the deflection plates 41. One of the two push-pull output leads is connected directly to a plate 41 while the other is connected to an adder circuit 46 that adds a push-pull signal to a red video signal that is obtained from the circuit that includes an oscillator 47, a source of red video signal 48 and a modulator 50. The source 48 of the red video signal may be the corresponding circuits in a color television or camera circuit that produce a red video signal. They are used to amplitude modulate a signal from an oscillator 47 in a modulator circuit 50. This amplitude modulated signal is then conducted to adder circuit 46 which adds this value to the push-pull horizontal voltage and then the sum signal is conducted to a horizontal deflection plate 41. The function of the signal from the oscillator 47 and of the signal from the red video signal source 48 form the diffraction gratings as will be explained below.

The electron beams are deflected vertically across the surface of the medium 12 by an electric field resulting from a potential applied to vertical deflection plates 52. This vertical deflection signal is a combined signal in which the conventional vertical deflection signal is combined with a signal that corresponds to the sum of the green and blue video signals. The conventional vertical deflection signal is produced by vertical deflection signal source 53 and then conducted to a push-pull amplifier 54 that converts this deflection signal into push-pull form. One of the push-pull voltages is conducted directly to one of the deflection plates 52 while the other push-pull voltage is applied to an adder circuit 55 to which is also applied a signal that corresponds to the green plus blue color content of the televised scene. This green plus blue modulated signal is obtained from a source 56 or the modulation may be obtained from the green and blue video signal sources 25 and 26 by adding their outputs. It can be obtained as a proportion of the difference between the red video signal and the Y or luminance signal that is present in television circuits. This difference is therefore designated "Y—R." The function of the complex signals that is applied to deflection plates 52 will be explained below.

As the electron beams deflect over the surface of medium 12 they produce a diffraction grating in the horizontal direction corresponding to the variable color signal and a diffraction grating in the vertical direction corresponding to the red color content of the televised scene. To understand the formation of these diffraction gratings the formation of the charge patterns must be explained. The charge pattern corresponding to the variable color signal will be explained first.

The electron beam from cathode 26 is separated into a number of beams by a beam splitter comprising wires 23. The charge pattern for the variable color signal is formed by the split electron beams as they deflect in a horizontal direction. The electric fields between the wires 23 cause the different portions of the electron beams passing through these wires to, preferably, converge towards one another, towards the axis of the electron gun. The angles of converging of these beams are determined by the signal applied to wires 23 from across resistor 32, which signal corresponds to the green and blue color content of the televised scene. The more green the color content, the more positive the signal. These beams preferably converge sufficiently to have a crossover point in the middle of the focusing lens and thus after passing through the focusing lens will diverge and thus strike the surface of medium 12 at points separated along a vertical line with separations that are a function of the signal applied to wires 23. The more positive the signal, the wider the separation between these beams. As the signal of wire 23 varies with the color content, the separation between these beams on medium 12 will change. As these beams are deflected in a horizontal direction, they produce horizontal lines of charge, separations between which are a function of the signal applied to wire 23, and thus have the green and blue color content of the televised signal. These beams can be of the order of 1½ microns in diameter and may have separations of the order of 3 microns. Thus, the resulting lines of charge have very small separations. The electrons in these lines of charge are attracted to the conducting coating on container 11 and thus press in along medium 12 to produce corresponding lines of deformations which form the desired diffraction grating. Since the lines of charge corresponding to the variable color signal, the parameters of the diffraction grating will correspond to the variable color content of the televised scene. The separation between these grating lines of course determines the diffracted color that reaches the projection screen. This separation is determined by the voltage applied to wires 23 and may be a combination of the green and blue video color signals as is explained in my copending application Serial Number 782,958, filed December 24, 1958, referred to above. The intensity of this diffracted light is, of course, also significant and this is determined by the depths of these, or amplitude of these diffraction grating lines. These depths are controlled by the Y—R modulated carrier signal applied to plates 52. This Y—R modulated carrier signal has a very high frequency so that the small beams are oscillated back and forth from their central position at a very rapid rate as compared to their horizontal deflection so that they more or less produce a smear. The Y—R signal determines the amplitude of these small modulations and thus determines the width of the smear and thus the charge density of the charge lines. The amplitude of the grating lines is a function of the charge density and therefore this Y—R signal controls the amplitude of the grating lines. Then the diffracted light produced by these horizontally extending diffraction grating lines corresponds to the blue and green intensity of the televised scene.

The frequency of the carrier signal for the Y—R signal is not especially significant except that it should be a rather high frequency signal as compared to the deflection rate of the electron beams. A frequency of the order of 20 megacycles or higher is sufficient.

The formation of the red diffraction grating in the vertical direction is accomplished by a process called velocity modulation. In effect the horizontal deflection rate of the electron beams is modulated at a desired rate which results in the production of a charge pattern corresponding generally to vertical lines of charge, the separations between which correspond to the desired red diffraction grating spacing, and the charge density corresponds to the red color intensity of the televised scene. As the electron beams are deflected in a horizontal direction by the horizontal deflection signal applied to plates 41 they are alternately speeded up and slowed down at a rate determined by the frequency of oscillation of an oscillator 47. The half cycles of oscillator 47 which slow down the beam deflection correspond to the red grating lines. The frequency of oscillator 47 is selected in relation to the horizontal sweep speed such that the separation between points on the surface of medium 12 corresponding to adjacent slow periods is equal to the desired red diffraction grating spacing. Thus, oscillator 47 determines the red diffraction grating spacing. The intensity of the resulting charge produced when the electron beams slow down is controlled by the amplitude of the red video signal from source 48. The greater the signal, the greater the slow down of electron beams, and thus the greater the charge density at that point. This velocity modulation is essentially the same as that disclosed in my Patent Number 2,813,146, except here it is illustrated for a single video color signal while in the patent, three color signals were impressed upon medium 12 in this way. The vertically extending lines of charge formed thereby are attracted to the conducting coating on container 11 and in so being attracted, deform the surface of medium 12 into vertically extending depressions which act as a phase diffraction grating for diffracting the light incident on the surface of medium 12.

It is to be realized that the electron beam system, that is all regions in which the electron beam travels, are enclosed in a highly evacuated enclosure (not shown).

The foregoing description has been directed to the means for producing the diffraction gratings in the light modulating medium 12. A specific means has been illustrated, which means forms a variable diffraction grating in one direction and a red diffraction grating in an orthogonal direction. However, the diffraction gratings may be formed in other ways and they may, if desired, extend all in one direction, although there are advantages in having them extend orthogonally. The diffraction gratings may be formed for example in the manner described and claimed in my aforementioned Patent 2,813,146 or in my copending application Serial Number 799,295, filed March 13, 1959, entitled "Electrical Signal Transducer and Optical System" (now Patent No. 3,078,338, dated February 19, 1963) and assigned to the present assignee, being a continuation-in-part of my application Serial Number 782,955, filed December 24, 1958 (now abandoned). In the latter instance a variable red-blue diffraction grating is formed in one direction on the medium, a green diffraction grating being formed in the orthogonal direction.

The following discussion is directed to the optical system which impinges light on light modulating medium that is then diffracted by these diffraction gratings and then is masked and finally projected on a projection screen.

The light source for the optical system preferably comprises four individual sources of preferably white light, 61, 62, 63, and 64 in FIG. 1. Reflectors 65 are associated with the light sources for reflecting parallel light toward the modulating medium 12. The positions of these light sources are significant since the diffraction gratings act to diffract light that is incident and reflected away in a plane at right angles to the grating lines. Light sources 61 and 62 are positioned such that the light from these sources will be diffracted by the variable color diffraction grating and sources 63 and 64 positioned so that their light will be diffracted by the red diffraction grating. In other words, if a plane is passed through the points determined by the axis of the optical system and the average position of the variable color diffraction grating lines, this plane will pass through light sources 63 and 64 so that they can be considered parallel to these lines; thus these lines will not affect light from these sources so far as the projection aperture of the present system is concerned. However, since the red diffraction grating lines are orthogonal to the variable color diffraction grating lines, the red diffraction grating will diffract the light from sources 63 and 64. Similarly if the plane is drawn through the points determined by the lines of the red diffraction grating and the axis of the optical system, the plane should desirably pass through light sources 61 and 62. Therefore, the red diffraction grating does not affect light from these sources in relation to the present system, while the variable color diffraction grating does.

All of these light sources are located on the focal surface of container 11. That is, they are located on a curved surface that would be generated by a radius the end of which is half way between container 11 and its center of curvature. With this arrangement it can be shown that light source 61 will be imaged by the mirror surface of container 11 at light source 62 (and vice versa) when there are no variable color diffraction gratings in medium 12, and likewise the light from source 63 will be imaged at light source 64 (and vice versa) when there are no red diffraction grating lines in medium 12. The angular positions of these light sources from the axis of the optical system can be determined from the equation $\theta_m = n\lambda/d$ wherein $n$ is the order of the diffraction pattern, the light from which it is desired to have projected on the projection screen, $d$ is the grating spacing of the respective diffraction grating lines and $\lambda$ is the wave length of the corresponding light which it is desired to diffract to the projection screen. $\theta_m$ is then the angle between the axis of the optical system and the line drawn from the respective light sources to the center of the mirror 11. In most applications it will be found desirable to employ first order diffracted light and thus $n$ will equal 1. For the angular positions of light at locations 63 and 64, the insertion of the center wave length $\lambda$ of the desired red color spectrum as well as insertion of a diffraction grating $d$ results in the proper $\theta$. For the angular positions of light sources 61 and 62 any one of the wave lengths of the desired variable color spectrum can be inserted for $\lambda$ in the equation, as well as the corresponding grating spacing $d$, and the $\theta$ for the positions of light sources 61 and 62 will be obtained.

With the light sources positioned at the indicated angles, the diffraction equation informs us that desired light will be diffracted along the axis of the optical system. Thus, an aperture should be placed along the optical axis. This aperture is formed by an opaque lens mounting 67 that holds the projection lens 68 on the optical axis. This lens 68 is preferably greater in diameter than the desired aperture opening so that there will be few aberrations caused by the lens surfaces near the edges of the lens. Therefore, the lens is stopped down as by the opaque mask 69 which has an opening 71 of the desired diameter.

The desired diameter of opening 1 can also be found from the diffraction equation set forth above. To find this diameter the wave length at one edge of the desired red spectrum is inserted for $\lambda$ and a $\theta$ is obtained; then the red wave length for the other end of the spectrum is inserted and another $\theta$ is obtained. One of the angles $\theta$ will be the angle between the line drawn between one of the light sources, either at 63 or 64 and the center of mirror 11, and a line drawn between the mirror center and the farther edge of opening 71. The other angle will correspond to the angle between this same line drawn from the same light source to the center of mirror 11, and the nearer edge of the opening 71. The same operation can be carried out for the variable color system in the other direction of the opening 71. Ordinarily, the opening corresponds nearly to a circle. Appropriate grating spacings are on the order of three microns being slightly different for the two different orthogonal directions if the same light angle optics are used in the two directions. In any case the grating spacings should be less than twenty microns and in most instances greater than one micron.

Preferably the position of lens 68 is close to the focal surface of mirror 11 which is at a distance from the mirror equal to the radius of the mirror. The radius of curvature of the focal surface is equal to one-half the radius of the mirror. As explained, for example, in my copending application Serial No. 782,956, filed December 24, 1958, (now Patent No. 3,044,358, dated July 17, 1962) entitled "Color Projection System" and assigned to the assignee of the present invention, the width of the light sources (including reflectors) depends upon considering first the width of the aperture 71. This can be determined from the diffraction equation as set forth above and the known desired color spectrum that is to be passed by this aperture. The grating spacings will be made quite small in the present application, and therefore the width of the aperture may be correspondingly large as compared to prior projection systems. Now, as shown in the above mentioned application, the width of the source in the direction orthogonal to the respective diffraction grating lines is a function of the width of this aperture 71. Since the width of aperture 71 is large, the width of a source which is in effect the size of the light sources 61, 62, 63 and 64 with reflectors can be made larger than in the prior system. Therefore, more light will be transmitted by aperture 71.

To obtain the same amount of light in the prior systems, a very large number of light sources has frequently been required. Moreover light blocking masks having slits or apertures in a second masking system have frequently been required; but in the present arrangement, one light source, or preferably two light sources, can be used for each diffraction grating and the masking system can be replaced by the lens mount for the projection lens. This greatly simplifies the system resulting in a saving of space. Moreover increased light transmitted by the aperture 71 to a projection screen 74 creates a brighter image of improved clarity. Increased light efficiency is achieved. The first order diffracted light tends to travel through the center of lens 68 utilizing the lens efficiently and resulting in decreased aberration.

Figure 2:
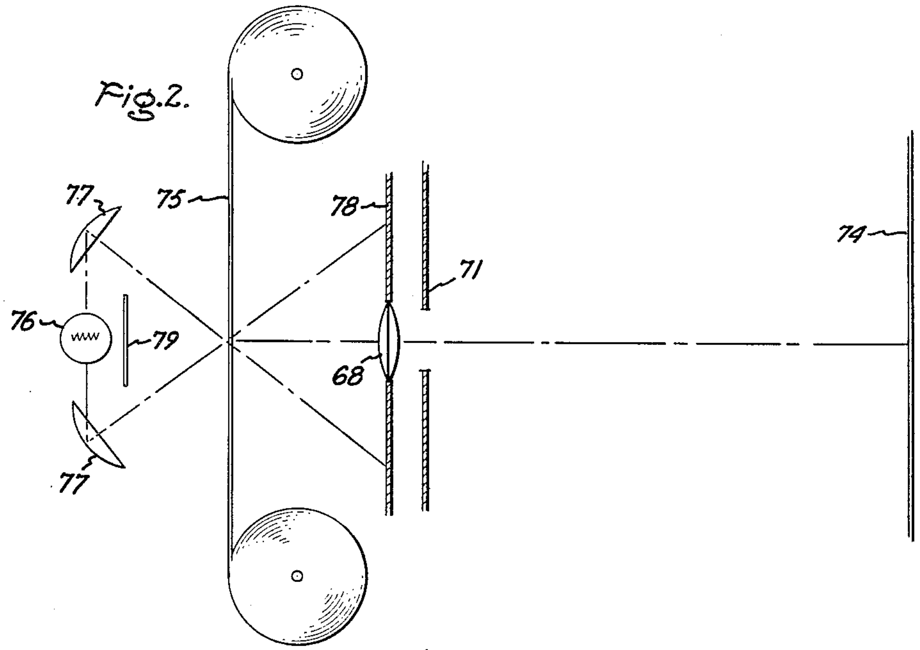
FIG. 2 is a schematic showing of a second embodiment.

The system illustrated in FIG. 2 is substantially the same in construction and operation as the FIG. 1 embodiment as respecting like components designated by like reference numerals and leads to the same advantages. The FIG. 2 system is adapted for utilizing a thermoplastic transparent modulating medium 75 which may be a type as set forth in my aforementioned copending application Serial Number 84,424, filed January 23, 1961, as a division of my copending application Serial Number 8,842, filed February 15, 1960, said application Serial Number 8,842 being a continuation-in-part of my application Serial Number 698,167, filed November 27, 1957 (now abandoned), and my application Serial Number 783,584, filed December 29, 1958 (now abandoned), all assigned to the assignee of the present invention. In the said application a method and apparatus for recording information as deformations of a thermoplastic medium is described and claimed. The thermoplastic medium for recording is described and claimed in copending divisional application Serial Number 84,424.

In the FIG. 2 embodiment it is therefore understood that modulating medium 75 will have been impressed with diffraction gratings, for example by means of an electron gun and electron deflection system as disclosed in the FIG. 1 embodiment.

In FIG. 2, a single light source 76 is conveniently employed to illuminate semi-spherical mirrors 77 whose reflecting axes make the same angle with the optical axis of the system as do the lights 61—64 in the FIG. 1 embodiment. The zero order of non-diffracted light is blocked by stop 71 or lens holder 78 so that it will not reach the screen 74. However, light diffracted by medium 75, preferably first order diffracted light, will pass through the optical axis of the system including projection lens 68 and stop 71 to form projected image on screen 74. Providing a single centrally located light source 76 is employed, a baffle, 79, is then disposed between light source 76 and the optical axis of the system.

It is understood the transmission-diffraction type of system as depicted in FIG. 2 may also employ other deformable media as set forth in connection with the FIG. 1 apparatus, or that an electron beam writing system may also be employed for concurrent diffraction pattern writing and optical projection with the FIG. 2 apparatus.

Figure 3:
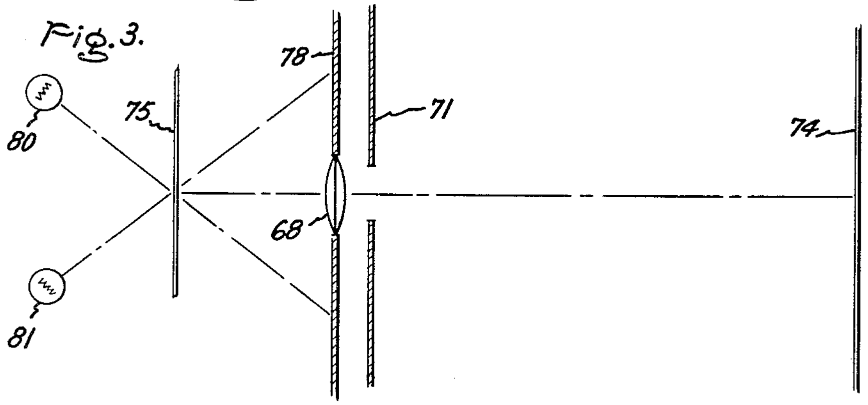
FIG. 3 is a schematic showing of a third embodiment.

The FIG. 3 arrangement is substantially the same as the FIG. 2 embodiment except that the reflectors 77, in FIG. 2, are replaced with separate light sources 80 and 81, eliminating the necessity of baffle 79. Otherwise the construction and operation as well as the advantages gained are the same.

While I have shown and described several embodiments of my invention, it will be apparent to those skilled in the art that many changes and modifications may be made without departing from my invention in its broader aspects; and I therefore intend the appended claims to cover all such changes and modifications as fall within the true spirit and scope of my invention.

I claim:

1. A system for presenting color information corresponding to a display comprising a light modulating medium, electrical means simultaneously subjecting said light modulating medium to color intelligence signals having different values of a first parameter corresponding to color components in the display and a second parameter varying in accordance with the intensity of said different color components to establish diffraction gratings on said medium with each grating having a narrow grating spacing less than twenty microns and corresponding to said first parameter, a light source for illuminating said modulating medium, and a single optical obstruction in the path of light from said light source for intercepting light not diffracted by said light modulating medium and cooperating with said diffraction gratings for passing light of a color selected by the diffraction produced by said gratings.

2. A system for projecting color information corresponding to a display comprising a light modulating medium, electrical means simultaneously subjecting said light modulating medium to color intelligence signals having different values of a first parameter corresponding to color components in the display and a second parameter varying in accordance with the intensity of said color components to establish diffraction gratings on said medium with each grating having a relatively narrow grating spacing corresponding to said first parameter, and an optical system comprising said modulating medium and an aperture together establishing a system axis and a light source illuminating said light modulating medium at an angle to said axis so that only the light diffracted by said modulating medium passes along said axis through said aperture, said aperture cooperating with said diffraction gratings for passing light of a color selected by the diffraction produced by said gratings.

3. A system for projecting information corresponding to a display comprising a light modulating medium, electrical means subjecting said light modulating medium to intelligence signals for establishing diffraction gratings on said medium corresponding to said display, and an optical system comprising said light modulating medium, a projection lens and lens stop and a projection screen all located substantially on the same axis, and at least one light source illuminating said light modulating medium at an angle to said axis, said lens stop acting to obstruct zero order light from said light source.

4. A system for projecting information corresponding to a display comprising a light modulating medium, electrical means subjecting said light modulating medium to intelligence signals for establishing diffraction patterns on said medium corresponding to said display, and an optical system comprising a mirror supporting said light modulating medium, a projection lens and a lens stop all located substantially on the same axis, and a plurality of light sources illuminating said light modulating medium at an angle with said axis so that light not diffracted by said modulating medium is prevented from passing through said projection lens by said lens stop.

5. A system for projecting color information corresponding to a display comprising a light modulating medium, electrical means simultaneously subjecting said light modulating medium to color intelligence signals having different values of a first parameter corresponding to color components in the display and a second parameter varying in accordance with the intensity of said color components to establish diffraction gratings on said medium with each grating having a relatively narrow grating spacing corresponding to said first parameter, and an optical system comprising a mirror supporting said light modulating medium, a projection lens and a lens stop all located substantially on the same axis, and a plurality of light sources illuminating said light modulating medium at an angle with said axis so that light not diffracted by said modulating medium is prevented from passing through said projection lens by said lens stop, said lens stop cooperating with said diffraction gratings for passing light of a color selected by the diffraction produced by said gratings.

6. The system as set forth in claim 5 where the said angle of illumination of said modulating medium by said light source is given by the ratio of the light wave length to the spacing of its corresponding grating and wherein said spacing is less than twenty microns.

7. The system set forth in claim 5 wherein the said angle of illumination of said modulating medium by said light source is given by the ratio of the light wave length to the spacing of its corresponding grating and wherein said spacing is on the order of three microns.

8. A system for projecting information corresponding to a display comprising a light modulating medium, electrical means subjecting said light modulating medium to intelligence signals for establishing diffraction patterns on said medium corresponding to said display, and an optical system comprising a transparent light modulating medium, a projection lens and a lens stop all located substantially on the same axis, and at least one light source arranged to direct light through said transparent light modulating medium at an angle to said axis so that light not diffracted by said modulating medium order is obstructed by said lens stop.

9. A system for projecting color information corresponding to a display comprising a light modulating medium, electrical means simultaneously subjecting said light modulating medium to color intelligence signals having different values of a first parameter corresponding to color components in the display and a second parameter varying in accordance with the intensity of said color components to establish diffraction gratings on said medium with each grating having a relatively narrow grating spacing corresponding to said first parameter, and an optical system comprising a transparent light modulating medium, a projection lens and a lens stop all located substantially on the same axis and at least one light source arranged to direct light through said transparent light modulating medium at an angle to said axis so that light not diffracted by said modulating medium order is obstructed by said lens stop, said lens stop cooperating with said diffraction gratings for passing light of a color selected by the diffraction produced by said gratings.

10. The system as set forth in claim 9 where the said angle of illumination of said modulating medium by said light source is given by the ratio of the color light wave length to the spacing of its corresponding grating and wherein said spacing is less than twenty microns.

11. The system set forth in claim 9 where the said angle of illumination of said modulating medium by said light source is given by the ratio of the light wave length to the spacing of its corresponding grating and wherein said spacing is on the order of three microns.

No references cited.